US005862885A

United States Patent [19]
Carmitchel

[11] Patent Number: 5,862,885
[45] Date of Patent: Jan. 26, 1999

[54] COMBINATION MOTORIZED AND MANUAL DRIVE FOR LIFTS

[76] Inventor: Richard A. Carmitchel, 15610 Honey Creek Rd., Bonner Springs, Kans. 66012

[21] Appl. No.: 710,865

[22] Filed: Sep. 23, 1996

[51] Int. Cl.[6] .............................. B60P 1/14; B66B 11/08; B66F 9/06; B66F 9/20

[52] U.S. Cl. .......................... 187/231; 187/263; 187/235; 187/244; 74/625; 254/4 B

[58] Field of Search .................................... 187/231, 235, 187/263, 244; 74/421 A, 625; 212/901; 254/4 C, 4 B, 419

[56] References Cited

U.S. PATENT DOCUMENTS

| | | | |
|---|---|---|---|
| 467,135 | 1/1892 | Quackenboss | 187/263 |
| 1,342,982 | 6/1920 | Boehck . | |
| 1,504,415 | 8/1924 | Barrett et al. | 187/235 |
| 1,512,390 | 6/1924 | Young | 187/235 |
| 1,690,107 | 11/1928 | Germond, Jr. | 187/235 |
| 2,301,579 | 11/1942 | Plant et al. | 254/4 C |
| 2,895,567 | 7/1959 | Hall . | |
| 3,026,744 | 3/1962 | Rouse | 74/625 |
| 3,120,845 | 2/1964 | Horner | 74/625 |
| 3,385,401 | 5/1968 | Campbell et al. . | |
| 3,671,015 | 6/1972 | Sullivan | 254/142 |
| 3,784,165 | 1/1974 | Pruitt | 254/168 |
| 3,901,330 | 8/1975 | Slator et al. | 173/57 |
| 4,190,233 | 2/1980 | Godfrey | 254/4 B |
| 4,269,285 | 5/1981 | Ohkoshi et al. . | |
| 4,506,702 | 3/1985 | Doup | 137/624.2 |
| 4,512,440 | 4/1985 | Bixby . | |
| 4,514,798 | 4/1985 | Lesche et al. | 364/188 |
| 4,580,463 | 4/1986 | Allouche et al. | 74/625 |
| 4,633,538 | 1/1987 | James | 187/244 |
| 4,643,418 | 2/1987 | Bart | 272/69 |
| 4,685,361 | 8/1987 | Myers | 82/2 R |

FOREIGN PATENT DOCUMENTS

| | | | |
|---|---|---|---|
| 200818 | 10/1924 | United Kingdom | 187/235 |
| 627323 | 8/1949 | United Kingdom | 187/235 |

OTHER PUBLICATIONS

Multiton's CWRS advertisement, Apr. 1984.

*Primary Examiner*—Karen M. Young
*Assistant Examiner*—Thuy V. Tran
*Attorney, Agent, or Firm*—Chase & Yakimo

[57] ABSTRACT

A power option is provided for a manually-operated material lift that employs a telescoping mast system which is extended or retracted by a winch. A reversible electric motor is connected to the winch via two-way reduction gearing that remains in the drive train during manual operation and requires no clutches or disconnect means. The power option is initiated by selecting the position of a reversing switch that controls the motor, and closing an on/off switch which energizes the motor for rotation in the selected direction. When the on/off switch is open, the lift may be manually operated in the conventional manner.

8 Claims, 3 Drawing Sheets

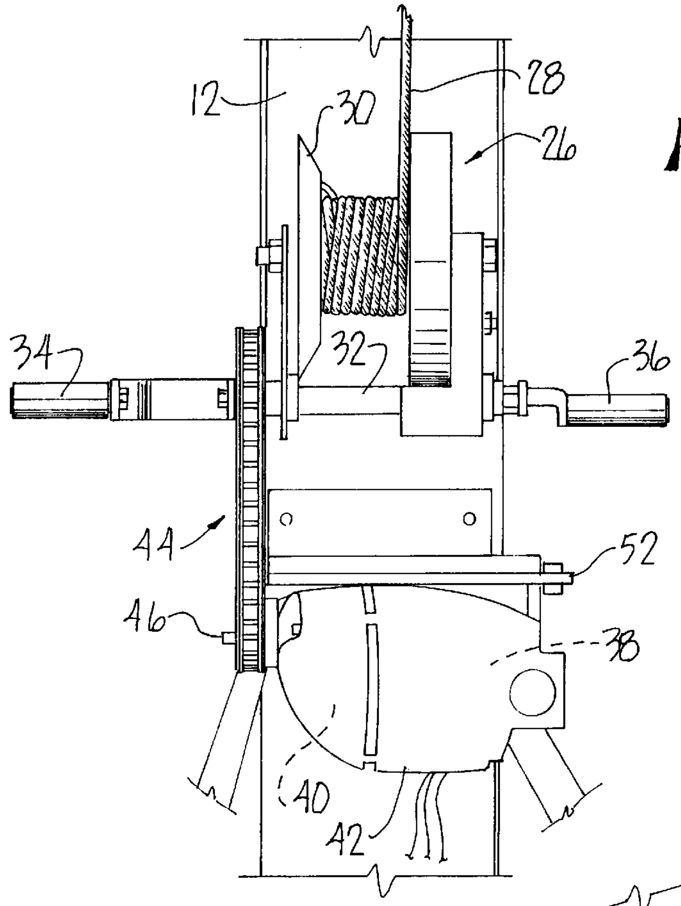
Fig. 3
Fig. 4
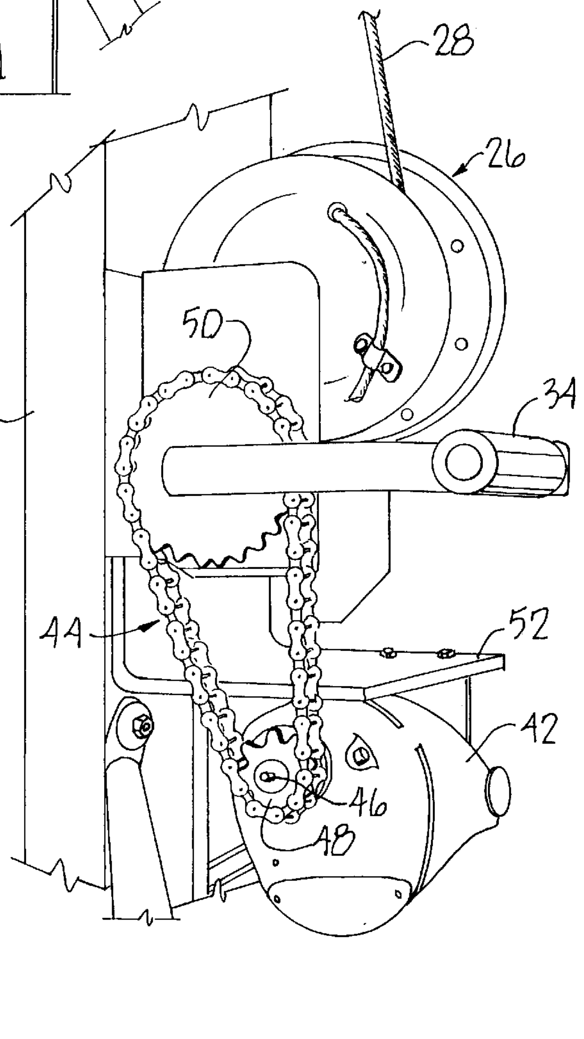

Fig. 5
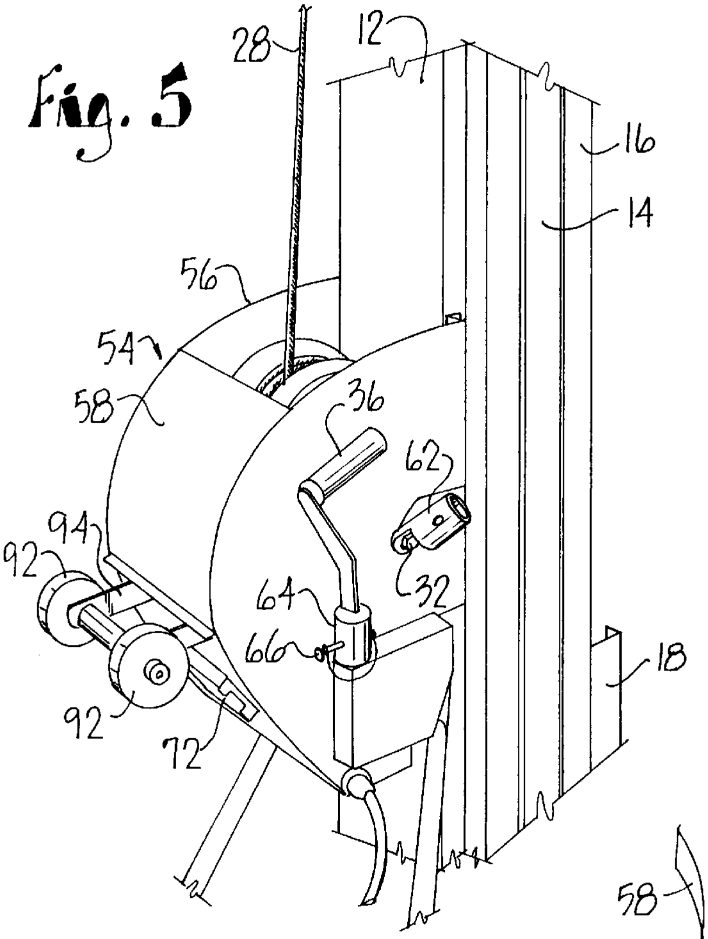
Fig. 6
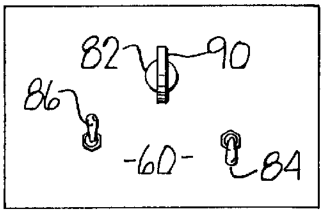
Fig. 7
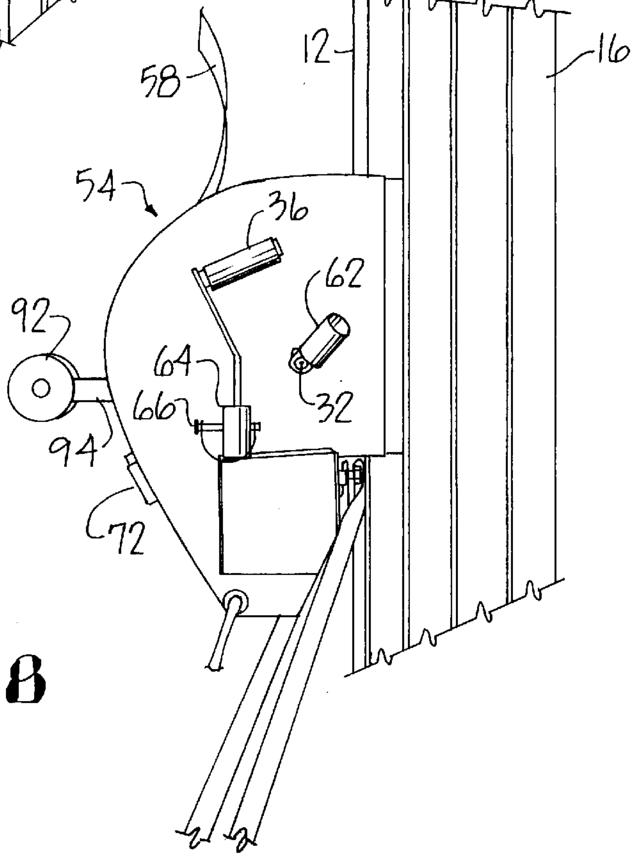
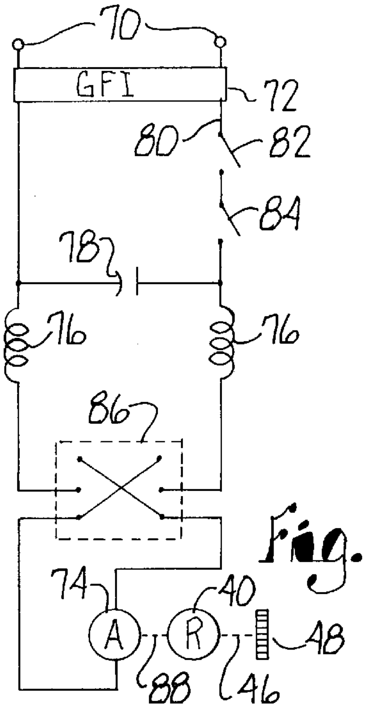
Fig. 8

COMBINATION MOTORIZED AND MANUAL DRIVE FOR LIFTS

BACKGROUND OF THE INVENTION

This invention relates to improvements in manually-operated material lifts that employ telescoping mast systems and, in particular, to a power option for such lifts which does not interfere with manual operation thereof.

Material lifts for construction and industrial applications in widespread use at the present time employ a telescoping mast system that enables a supported load to be raised to a desired level or lowered from a stored position for use or transport to another location. These lifts are typically manually operated through the use of a winch which either takes up or feeds out a cable that either extends the mast sections or retracts them as desired. Although lifts of this type have been proven to be highly useful and satisfactory, manual operation is a limitation on their utilization and the speed at which loads can be handled.

SUMMARY OF THE INVENTION

It is, therefore, the primary object of the present invention to provide a power option for material lifts of the type employing telescoping mast systems operated by a winch, wherein the winch may be driven by a reversible electric motor without interfering with normal manual operation.

As a corollary to the foregoing object, it is an important aim of this invention to provide such a power option which does not require the use of clutches or other means to disconnect the motor from the winch during manual operation, thereby providing a simple power option at minimum cost.

Another important object is to provide a power option as aforesaid in which the electric motor, when selected for operation, drives the winch via two-way reduction gearing which does not lock up when manual operation is selected and the transmission parts are required to rotate with the motor de-energized.

Still another important object is to provide a power option as aforesaid in which, when electric motor drive is selected, the winch is driven at a higher speed than during manual operation in order to increase the efficiency of the lift.

Yet another important object of the invention is to provide a power option for lifts of this type utilizing an electric motor and reduction gear transmission mounted on the stationary mast support section of the mast system, a sprocket and chain drive interconnecting the transmission and the winch, and a control panel having on/off and reversing switches for controlling the motor, all of which is enclosed in a housing mounted on the support section for convenient access by the operator.

Furthermore, objects of this invention include additional operating features, i.e., the provision of a door on the housing to permit access to the control panel, the provision of a key-operated switch to preclude use of the power option other than by authorized personnel, and a removable crank handle for the winch which may be conveniently retained on the housing in a stored position during motorized operation.

Other objects will become apparent as the detailed description proceeds.

BRIEF DESCRIPTION OF THE DRAWINGS

FIG. 3 is an enlarged, fragmentary, front view of the mast assembly showing the support section and drive components mounted thereon, the housing being removed for clarity.

FIG. 4 is a further enlarged, perspective view of the components shown in FIG. 3 as seen from the left side of FIG. 3.

FIG. 5 is a perspective view of the apparatus shown in FIG. 3 as seen from the right side of FIG. 3, the housing being added and a crank handle being shown stored.

FIG. 6 is a detail of the control panel as seen in plan when the access door is open as in FIG. 7.

FIG. 7 is an enlarged, fragmentary, side elevational view of the lift apparatus shown in FIG. 2, with the access door open.

FIG. 8 is a schematic diagram of the control circuit and drive components.

DETAILED DESCRIPTION

Figure 1:
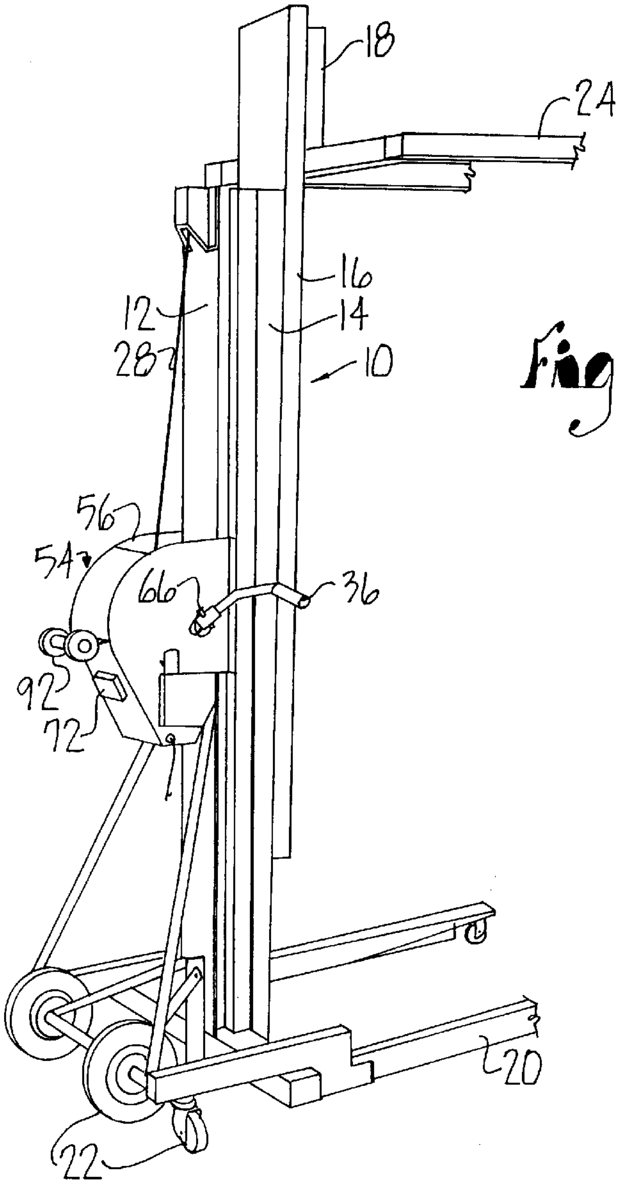
FIG. 1 is a perspective view of a material lift incorporating the improvements of the present invention, the telescoping mast assembly being shown partially extended.

A material lift shown in FIGS. 1–5 and 7 is of the type employing a four-section telescoping mast assembly 10 having a stationary support section 12 and three extendible mast sections 14, 16 and 18. The bottom of the support section 12 is secured to an underlying base 20 having wheels and castors 22 as shown to permit the lift to be readily moved from location to location. Absent the improvement of the present invention to be discussed, lifts of the type illustrated are exclusively manually operated and are manufactured by Genie Industries of Redmond, Wash., U.S.A. and sold under the trademark SUPERLIFT.

Figure 2:
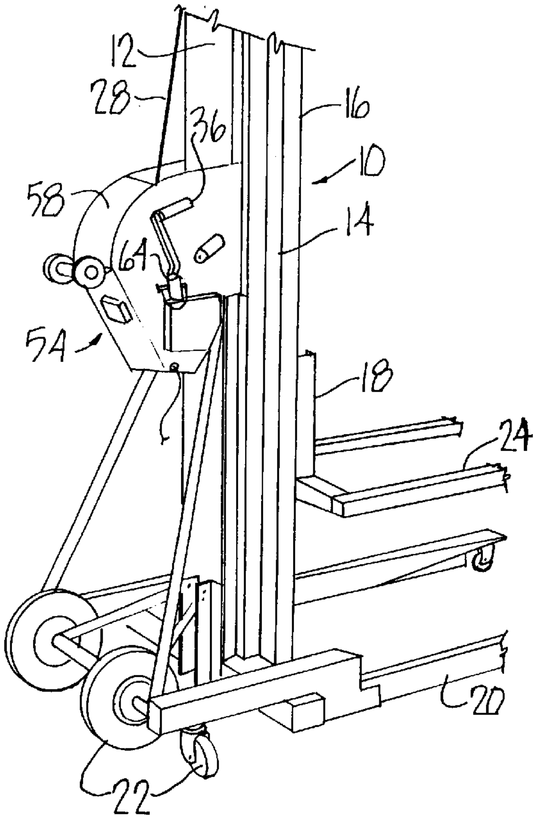
FIG. 2 is a fragmentary, perspective view similar to FIG. 1 but showing the mast assembly fully retracted.

In the particular lift illustrated employing the four-section telescoping mast assembly 10, the outermost lifting section 18 is provided with an outwardly extending fork 24 for supporting a load (not shown) to be raised or lowered by a winch 26 best seen in FIGS. 3 and 4. The mast sections are interlocked but slide longitudinally (vertically) with respect to one another in response to the takeup or release of the winch cable 28 which is connected to the movable mast sections 14, 16 and 18 by an internal pulley system (not shown) that causes the outermost section 18 to extend first, followed by sections 16 and 14 in sequence in the conventional manner. In FIG. 1, mast section 18 is shown fully extended and section 16 is partially extended. In FIG. 2, the winch cable 28 is released and all sections are fully retracted.

Referring to FIGS. 3 and 4, the winch 26 is mounted on the front of the support section 12 and includes a drum 30 upon which the cable 28 is wound, and a crankshaft 32 having crank handles 34 and 36 on its respective ends for manually rotating the crankshaft 32 to, in turn, drive the drum 30 through appropriate gearing (not visible). The present invention adds a power option and includes, as major components thereof, a reversible electric motor 38 and reduction gear transmission 40 in a case 42, a sprocket and chain drive 44 from the transmission 40 to the crankshaft 32, and control circuitry for the motor 38 shown in FIG. 8. These components are fully described below.

The motor 38 (typically ¼ hp) and reduction gear transmission 40 in the preferred embodiment illustrated are components utilized in standard half-inch drills such as for example, a ½" spade handle drill manufactured by Black & Decker, Inc. of Hampstead, Md., U.S.A. The handle is removed from the case 42, and the chuck on drive shaft 46 is replaced by a sprocket 48 of drive 44. A larger sprocket 50 on crankshaft 32 provides an additional 4:1 gear reduction so that crankshaft 32, when driven by motor 38, turns at 100 r.p.m. This is approximately twice the speed that crankshaft 32 would be driven by hand using handles 34 and 36. The case 42 containing motor 38 and transmission 40 is conveniently mounted below crankshaft 32 by an angle bracket 52 secured to support section 12.

As seen in FIGS. 1, 2, 5 and 7, a housing 54 projects forwardly from support section 12 and encases the case 42, drive 44 and winch 26 except for an open top 56 thereof which provides clearance for the winch cable 28. The housing 54 may be of sheet metal construction and is provided with an access door 58 swingable to an open or raised position as seen in FIG. 7 to provide the operator with access to a horizontal control panel 60 (FIG. 6) within housing 54.

For convenience during motorized operation, the crank handles 34 and 36 may be disconnected from crankshaft 32 and stored. This is illustrated for handle 36 by a comparison of FIGS. 1 and 2, the stored position of FIG. 2 being shown in detail in FIGS. 5 and 7. The end of the crankshaft 32 seen in FIGS. 5 and 7 is provided with a socket 62 from which handle 36 is removed and replaced in a mating socket 64 on the side of housing 54. Socket 64 extends vertically so that handle 36 is held in an upright position against housing 54, the handle 36 being retained in such stored position by a cross pin 66 through socket 64 and a cross hole (not shown) in the arm of handle 36. When reinstalled on the crankshaft, handle 36 is secured in like manner by the cross pin 66 (FIG. 1). (This feature is not shown in FIGS. 3 and 4.)

The control circuit (FIG. 8) is supplied with 110 volt alternating current at terminals 70 and is protected by a ground fault interrupter 72 (the grounding lead is omitted for simplicity). The motor 38 includes an armature 74 and field windings 76, and a parallel capacitor 78. From the GFI 72, the ungrounded lead 80 has a key-operated switch 82 and an on/off switch 84 imposed in series therein. The armature 74 and windings 76 are connected to a reversing switch 86 that controls the up/down movement of the mast assembly. The motor armature 74 has an output shaft 88 connected to the reduction gear transmission 40 which turns the drive shaft 46 at 400 r.p.m.

The switches described above with reference to FIG. 8 are identified in FIG. 6 with the same reference numerals. A key 90 is shown inserted in the key-operated switch 82. The GFI 72 may be mounted on the front of the housing 54 to also provide a convenience outlet for other electric tools or lights. A pair of rollers 92 are mounted on fingers 94 projecting forwardly from housing 54 to facilitate movement of the apparatus along the floor when tilted over for movement to another working location.

In use, an authorized operator raises the access door 58 and inserts the key 90 to close switch 82 and condition the control circuit for operation. The position of the reversing switch 86 is first selected in accordance with whether up or down movement (extension or retraction) of the mast is desired. Then the on/off switch 84 is closed to energize motor 38 until the fork 24 reaches or approaches the desired level. The operator may then elect to open the switch 84 and make a final adjustment in the position of the fork 24 using one or both of the crank handles 34, 36.

During manual operation, either to adjust the height of the fork 24 or to raise or lower the lifting sections 14, 16 and 18 of the mast a substantial distance manually, it should be understood that it is only required that the operator set the switch 84 in the open or off position. The reduction gear transmission 40 employs meshing spur and pinion gears and thus transfers rotation in the reverse direction from drive shaft 46 to motor output shaft 88 when the winch 26 is manually rotated by crank handles 34 and 36. With the motor 38 de-energized, its armature 74 is rotated manually with the winch 26 but presents a negligible load as compared with the force that is applied to the winch cable 28. Accordingly, no clutches or other means are required to disconnect the motor 38 when manual operation is elected. The selection of the power option or standard manual operation, therefore, merely requires operating the on/off switch 84 to either energize or de-energize the motor.

Having thus described the invention, what is claimed as new and desired to be secured by letters patent is as follows:

1. In a material lift having a telescoping mast assembly including a stationary support section and at least one lifting section carried by the support section and movable between a lower, retracted position and an upper, extended position, and where a manually operated winch is mounted on the support section for raising and lowering the lifting section, the winch having a crankshaft which can be turned by a handle to operate the winch and raise and lower the lifting section, the improvement comprising:

a reversible electric motor mounted on said support section and having an output shaft, two-way reduction gear means connected to said output shaft and having a drive shaft which rotates at a lesser speed than said output shaft, drive means coupling said drive shaft with said crankshaft, a control circuit connected to said motor and having on/off switch means for selecting motorized operation or manual operation of the winch, and reversing switch means for selecting upward or downward movement of the lifting section during motorized operation, whereby to provide the option of motorized drive for the lift, and said gear means including meshing spur and pinion gears and transferring rotation in a reverse direction from said drive shaft to said output shaft when the crankshaft is manually turned to operate the winch, whereby the motor remains connected to the drive means during manual operation through the meshing spur and pinion gears.

2. The improvement as claimed in claim 1, wherein said drive means has a drive ratio reducing the speed of the crankshaft relative to the drive shaft.

3. The improvement as claimed in claim 2, wherein said drive means includes a sprocket and chain assembly interconnecting the drive shaft and the crankshaft.

4. The improvement as claimed in claim 1, wherein said control circuit includes a key operated switch for controlling the application of electric current to the on/off switch means and the reversing switch means.

5. The improvement as claimed in claim 1, further comprising means for mounting said motor on the support section below the winch, and a housing on the support section enclosing the winch, motor, reduction gearing means and drive means.

6. The improvement as claimed in claim 5, wherein said housing has an access door movable between closed and open positions, and a control panel in the housing accessible when the door is open, said on/off switch means and said reversing switch means being mounted on said panel.

7. The improvement as claimed in claim 5, further comprising releasable means connecting said handle to said crankshaft, and means on said housing for retaining said handle in a stored position when the handle is disconnected from the crankshaft for motorized operation of the lift.

8. In a material lift having a telescoping mast assembly including a stationary support section and at least one lifting section carried by the support section and movable between a lower, retracted position and an upper, extended position, and where a manually operated winch is mounted on the support section for raising and lowering the lifting section, the winch having a crankshaft which can be turned by a handle to operate the winch and raise and lower the lifting section, the improvement comprising:

a reversible electric motor mounted on said support section and having an output shaft, two-way reduction gear means connected to said output shaft and having a drive shaft which rotates at a lesser speed than said output shaft, drive means coupling said drive shaft with said crankshaft, releasable means connecting said handle to said crankshaft, a control circuit connected to said motor and having on/off switch means for selecting motorized operation or manual operation of the winch, and reversing switch means for selecting upward or downward movement of the lifting section during motorized operation, whereby to provide the option of motorized drive for the lift, means on the support section for retaining said handle in a stored position when the handle is disconnected from the crankshaft for motorized operation of the lift, and said gear means transferring rotation in a reverse direction from said drive shaft to said output shaft when the crankshaft is manually turned to operate the winch, whereby the motor remains connected to the drive means during manual operation.

* * * * *